(12) United States Patent
Li et al.

(10) Patent No.: US 12,273,715 B2
(45) Date of Patent: Apr. 8, 2025

(54) METHOD OF EFFICIENTLY PROVIDING PATHHISTORY IN C-V2X

(71) Applicant: QUALCOMM Incorporated, San Diego, CA (US)

(72) Inventors: Yan Li, Beijing (CN); Shuping Chen, Beijing (CN); Yue Yin, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 406 days.

(21) Appl. No.: 17/759,140

(22) PCT Filed: Jun. 16, 2020

(86) PCT No.: PCT/CN2020/096356
§ 371 (c)(1),
(2) Date: Jul. 20, 2022

(87) PCT Pub. No.: WO2021/184562
PCT Pub. Date: Sep. 23, 2021

(65) Prior Publication Data
US 2023/0045323 A1    Feb. 9, 2023

(30) Foreign Application Priority Data
Mar. 16, 2020   (WO) ............... PCT/CN2020/079432

(51) Int. Cl.
*H04W 12/069*    (2021.01)
*H04W 4/029*    (2018.01)
(Continued)

(52) U.S. Cl.
CPC ......... *H04W 12/069* (2021.01); *H04W 4/029* (2018.02); *H04W 12/02* (2013.01); *G08G 1/163* (2013.01); *H04W 4/40* (2018.02)

(58) Field of Classification Search
CPC ............... H04W 12/069; H04W 4/029; H04W 12/02; H04W 4/40; G08G 1/163
See application file for complete search history.

(56) References Cited

U.S. PATENT DOCUMENTS 11,025,607 B2 * 6/2021 Narayanan .......... H04W 12/069
11,222,726 B2 * 1/2022 Cannell .................. H04W 4/80
(Continued)

FOREIGN PATENT DOCUMENTS

CN    109005539 A    12/2018
CN    110393039 A    10/2019
(Continued)

OTHER PUBLICATIONS

CATT: "Discussion and Proposals on Traffic Models for PC5 V2V", 3GPP TSG RAN WG1 Meeting #82, R1-153953, Aug. 28, 2015 (Aug. 28, 2015), 3 Pages, the whole document.
(Continued)

*Primary Examiner* — Cheng-Feng Huang
(74) *Attorney, Agent, or Firm* — Muncy, Geissler, Olds & Lowe, P.C.

(57) ABSTRACT

Various embodiments provide methods, vehicle computing devices, storage media, and systems for briefly providing PathHistory information in Broadcast Safety Messages (BSMs) sent from a vehicle when PathHistory information is not required to be included in all BSMs. Various embodiments may include broadcasting BSMs including PathHistory information during a period of time following a change of the vehicle's pseudonym certificate and broadcasting BSMs without PathHistory information at all other times. Some embodiments may further include determining whether sufficient path history points are available for PathHistory information generation, accumulating path history points in response to determining that sufficient path history points are not available for PathHistory information (Continued)

generation, and broadcasting BSMs including PathHistory information during the period of time once sufficient path history points have been accumulated.

27 Claims, 10 Drawing Sheets

(51) Int. Cl.
*H04W 12/02* (2009.01)
*G08G 1/16* (2006.01)
*H04W 4/40* (2018.01)

(56) References Cited

U.S. PATENT DOCUMENTS

| | | | |
|---|---|---|---|
| 2009/0055691 A1* | 2/2009 | Ouksel | H04W 64/00 |
| | | | 714/48 |
| 2018/0097637 A1 | 4/2018 | Weinfield | |
| 2018/0115898 A1* | 4/2018 | Han | G01S 19/42 |
| 2018/0176209 A1* | 6/2018 | Narayanan | H04W 48/10 |
| 2019/0138007 A1 | 5/2019 | Baghsorkhi et al. | |
| 2019/0245831 A1 | 8/2019 | Petit et al. | |
| 2019/0326015 A1* | 10/2019 | Cannell | G16H 40/20 |

FOREIGN PATENT DOCUMENTS

| | | |
|---|---|---|
| CN | 110447245 A | 11/2019 |
| CN | 110459052 A | 11/2019 |
| CN | 110647164 A | 1/2020 |
| CN | 110679168 A | 1/2020 |
| EP | 3606124 A1 | 2/2020 |
| KR | 101837338 B1 | 3/2018 |

OTHER PUBLICATIONS

Forster D, et al., "An Evaluation of Pseudonym Changes for Vehicular Networks in Large-Scale, Realistic Traffic Scenarios," IEEE Transactions on Intelligent Transportation Systems, Oct. 31, 2018 (Oct. 31, 2018) No. 10 vol. 19, pp. 3400-3405, 6 pages, the whole document.
International Search Report and Written Opinion—PCT/CN2020/096356—ISA/EPO—Dec. 16, 2020; 8 pages.
International Search Report and Written Opinion—PCT/CN2020/079432—ISA/EPO—Nov. 27, 2020; 8 pages.
LG Electronics Inc: "Correction on V2X Privacy," 3GPP TSG-SA WG1 #74, S1-161141, May 9-13, 2016 (May 13, 2016), 6 pages, the whole document.
Qualcomm Incorporated: "Transmit Less-than-Expected Data for Configured V2X Sidelink Grant for Transmission of Multiple MAC PDUs", 3GPP TSG RAN WG2 Meeting #101, R2-1803599, Mar. 2, 2019 (Mar. 2, 2019), 3 Pages, the whole document.
Bittl S, "Titel Der Arbeit: Efficient Secure Communication in VANETs Under the Presence of New Requirements Emerging from Advanced Attacks", Sep. 11, 2017, XP055854394, 188 pages, section 2.2, chapter 4.
Kenney J.B., "Dedicated Short-Range Communications (DSRC) Standards in the United States," Proceedings of the IEEE, 2011, vol. 99 (7), Jul. 1, 2011, pp. 1162-1182, XP055387173, New York, p. 1176, Section IEEE 1609.2, Authentication—p. 1177, Left column, p. 1175, right-hand column, line 34, p. 1180, right-hand column, line 6.
LGE: "Correction on V2X Privacy", 3GPP TSG-SA WG1 Meeting #75, S1-162507, No. San Francisco, USA, Aug. 22-26, 2016, 4 Pages.
Supplementary European Search Report—EP20925453—Search Authority—The Hague—Mar. 11, 2024 6 pages.

* cited by examiner

METHOD OF EFFICIENTLY PROVIDING PATHHISTORY IN C-V2X

RELATED APPLICATIONS

This application claims the benefit of priority to International Patent Application No. PCT/CN2020/079432, entitled "A Method of Efficiently Providing PathHistory In C-V2X" filed on Mar. 16, 2020, the entire contents of which are incorporated herein by reference for all purposes.

BACKGROUND

Cellular and wireless communication technologies have seen explosive growth over the past several years and are being used to support communications between a host of different types of communication devices, such as smartphones, vehicle-based communication devices, infrastructure communication devices, network communication devices, etc. This growth has been fueled by better communications hardware, larger networks, and more reliable protocols.

The surface transportation industry has increasingly looked to leverage the growing capabilities of cellular and wireless communication technologies through the adoption of Intelligent Transportation Systems (ITS) technologies to increase intercommunication and Safety for both driver-operated vehicles and autonomous vehicles. The cellular vehicle-to-everything (C-V2X) protocol defined by the 3rd Generation Partnership Project (3GPP) supports ITS technologies and serves as the foundation for vehicles to communicate directly with the communication devices around them.

C-V2X communication technologies hold promise for improving vehicle safety, managing traffic congestion and support autonomous and semi-autonomous vehicles.

PathHistory (PH) is a field in a C-V2X Basic Safety Messages (BSM). The PathHistory data frame defines a geometric path reflecting time tagged vehicle movement over some period of time and/or distance. In practice, a sequence of PathHistory Points along with their Global Navigation Satellite System (GNSS) time are used to create a set of straight line segments representing the vehicle's historic path. Some countries are now making the inclusion of PathHistory fields in BSM messages, as doing so reduces the amount information that is transmitted within limited bandwidth available for such messages, referred to as over-the-air resources.

A pseudonym certificate is used in C-V2X to protect a vehicle/user's privacy. If a vehicle always uses a fixed certificate, others will be able to track the vehicle's location and route, which exposes the vehicle's privacy. In C-V2X standards, a vehicle must change its pseudonym certificate every 300 seconds.

SUMMARY

Various aspects include methods for providing PathHistory information when broadcasting PathHistory information is not required in Broadcast Safety Messages (BSMs). Various aspects include determining whether a pseudonym certificate for the vehicle has changed, and broadcasting BSMs including PathHistory information during a period of time from a time the pseudonym certificate change occurred in response to determining that the pseudonym certificate for the vehicle changed, in which the period of time is less than the time between pseudonym certificate changes. In some aspects, the period of time may be one second. Some aspects further include broadcasting BSMs without PathHistory information following the expiration of the period of time. In some aspects, a periodicity of broadcasting BSMs including PathHistory is after a selected number of BSMs broadcast without PathHistory. In some aspects, the selected number may be 10. In some aspects, a periodicity of broadcasting BSMs including PathHistory may be after a selected number of seconds. In some aspects, the selected number may be 1. Some aspects further include determining whether a tracking error based on tracking the vehicle using vehicle location information included in BSMs exceeds an error threshold, and broadcasting a BSM including PathHistory information in response to determining that the tracking error exceeds the error threshold. Some aspects further include, prior to broadcasting BSMs including PathHistory information during the period of time from the time the pseudonym certificate change occurred in response to determining that the pseudonym certificate for the vehicle changed, determining whether sufficient path history points are available for PathHistory information generation in response to determining that the pseudonym certificate for the vehicle changed, accumulating path history points in response to determining that sufficient path history points are not available for PathHistory information generation, and generating PathHistory information in response to determining that sufficient path history points are available for PathHistory information generation.

Further aspects include a vehicle including a vehicle computing device having a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a computing device for use in a vehicle and configured to perform operations of any of the methods summarized above. Further aspects include a vehicle having means for performing functions of any of the methods summarized above.

BRIEF DESCRIPTION OF THE DRAWINGS

The accompanying drawings, which are incorporated herein and constitute part of this specification, illustrate exemplary embodiments of the Claims, and together with the general description given above and the detailed description given below, serve to explain the features of the Claims.

DETAILED DESCRIPTION

Figure 1A:
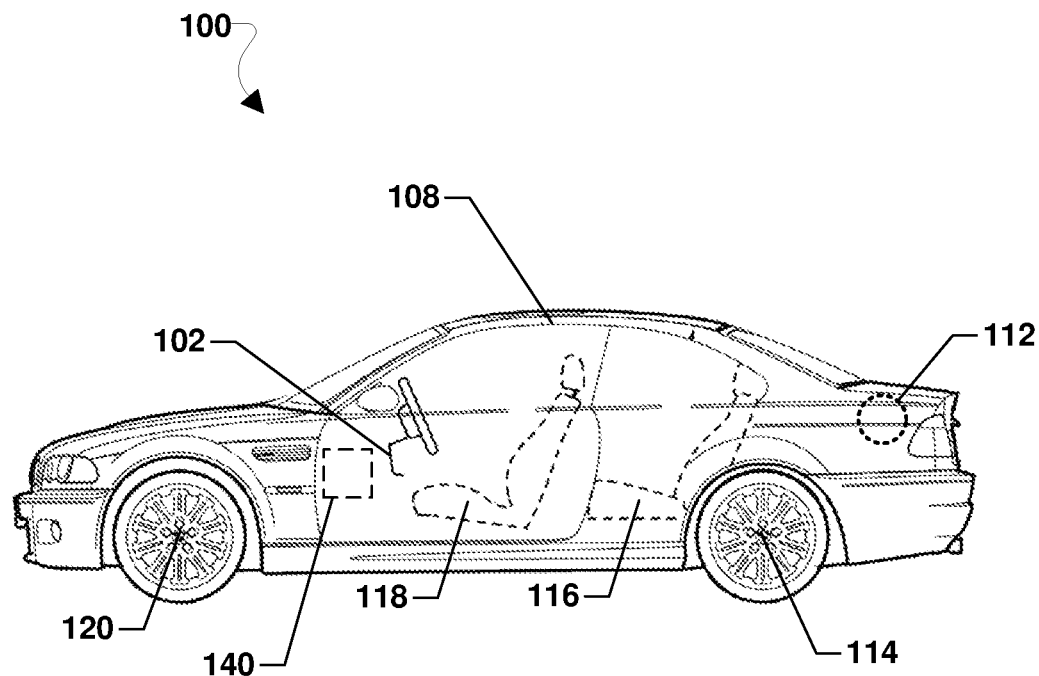
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

C-V2X communication technologies hold promise for improving vehicle safety, managing traffic congestion and support autonomous and semi-autonomous vehicles. However, successful implementation of C-V2X communication technologies requires solutions to the problem of communication congestion that will arise when many vehicles present on a roadway (e.g., during commuter traffic), problems of vehicle tracking when vehicle identities are obscured by changing pseudonym certificates, and/or air resource utilization when C-V2X messages, such as BSM messages are too large (and/or take too long to transmit).

PathHistory information may be generated by a vehicle from a series of path history points, which may be recorded, timestamped, and stored position, speed, and heading indications. The vehicle may log its position, speed, and heading as path history points and use a number of past stored path history points to generate its respective PathHistory information. PathHistory information is useful to other vehicles by enabling vehicle safety and autonomous driving system to determine the speeds and directions of surround vehicles, thus enabling vehicles to better avoid collisions and to coordinate traffic movements. However, this information field adds overhead to BSMs. For example, even if only mandatory fields are included, one PathHistory point location report requires 8 bytes. Typically, five PathHistory points are included in a PathHistory field of a BSM message, resulting in the PathHistory field having 40 bytes. This adds more than 10% overhead to the BSM including PathHistory when compared to a BSM that is generated without PathHistory information.

To address this problem, some countries are adopting C-V2X protocols that make the inclusion of PathHistory information optional or not permitted. Doing so will reduce the communication congestion in BSM frequencies as PathHistory data will be left out of BSMs. If PathHistory information is not provided in BSMs, vehicles could determine the travel speeds and directions of vehicles around them using the GPS position and timestamp information included in BSMs by storing such information linked to vehicle identifiers, namely the pseudonym certificate in BSMs, effectively recreating path histories.

However, privacy provisions in C-V2X standards require vehicles to change their pseudonym certificate every 300 seconds, which means that recreated path histories developed in vehicles by monitoring vehicle GPS location and time stamp information are only good for less than 300 seconds. When vehicles change their pseudonym certificate there is no way to link stored vehicle GPS location and time stamp information to particular vehicles. As a result, right after a vehicle changes its pseudonym certificate, other vehicles cannot know its path history information for some period. Thus, recreated path histories must be started over, resulting in a period of time of several seconds during which vehicles are uniformed about the travel speed and direction of the vehicle that changed its pseudonym certificate. This loss of vehicle tracking every 300 seconds has negative impact to safety applications.

Various embodiments provide methods for sending PathHistory in C-V2X messages, such as BSM messages, in limited instances and for limited time sufficient to enable other vehicles to maintain awareness of vehicle speed and direction through monitoring of vehicle location information in BSMs. Transmitting PathHistory information for a limited period of time, such as one second, such as following a pseudonym certificate change, will enable vehicles to achieve the safety benefits of tracking the speed and direction of other vehicles while reduce the air resources consumed by BSM be not including PathHistory information in most BSMs.

As used herein, the term "Road Side Unit" (or "RSU") refers to highway computing systems that include a processor configured to perform C-V2X communications and similar operations. Road Side Units may be part of a C-V2X communication network or system.

As used herein, the term "communication device" refers to any one or all of cellular telephones, smartphones, portable computing devices, driver assistance systems, vehicle controllers, vehicle system controllers, vehicle communication system, infotainment systems, vehicle telematics systems or subsystems, vehicle display systems or subsystems, vehicle data controllers or routers, and similar electronic devices which include a programmable processor and memory and circuitry configured to perform operations as described herein. While the various aspects are particularly useful for in-vehicle communication systems and/or computing devices, the aspects are generally useful in any communication device that includes communication circuitry for communicating with Road Side Units and a processor that executes application programs.

The term "system-on-chip" (SoC) is used herein to refer to a set of interconnected electronic circuits typically, but not exclusively, including one or more processors, a memory, and a communication interface. The SoC may include a variety of different types of processors and processor cores, such as a general purpose processor, a central processing unit (CPU), a digital Signal processor (DSP), a graphics processing unit (GPU), an accelerated processing unit (APU), a sub-system processor, an auxiliary processor, a single-core processor, and a multicore processor. The SoC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SoCs may be integrated circuits (ICs) configured such that the components of the IC reside on the same substrate, such as a single piece of semiconductor material (e.g., silicon, etc.).

The term "system in a package" (SIP) is used herein to refer to a single module or package that may contain multiple resources, computational units, cores and/or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SoCs coupled together via high speed communication circuitry and packaged in close proximity, such as on a single motherboard or in a single mobile communication device. The proximity of the SoCs facilitates high speed communications and the sharing of memory and resources.

Various embodiments provide methods, vehicle computing devices, storage media, and systems for briefly providing PathHistory information in BSMs sent from a vehicle when PathHistory information is not required in all BSMs. Various embodiments may include broadcasting BSMs including PathHistory information during a period of time from a time a pseudonym certificate change occurred. The broadcasting of BSMs including PathHistory information may be performed in response to determining that the pseudonym certificate for the vehicle changed. The period of time for broadcasting BSMs including PathHistory may be one second. In various embodiments, every time right after a vehicle changes its pseudonym certificate, the vehicle causes its broadcast BSMs to carry PathHistory for the first N seconds. For example, N can be 1. After the first N seconds, the PathHistory is not needed in BSMs as long as the pseudonym certificate remains unchanged because other vehicles can use vehicle GPS location and time stamp information included in BSMs. The process may repeat at the expiration of the 300 second pseudonym certificate lifetime and the pseudonym certificate is again changed. In various embodiments, the vehicle may begin broadcasting BSMs without PathHistory information following the expiration of the period of time, such as after N seconds. In this manner, for the rest of the pseudonym certificate lifetime (e.g., the remaining 299 seconds), BSMs without PathHistory information may be broadcast. This may reduce the air resource utilization in comparison to broadcasting PathHistory in every BSM during the pseudonym certificate lifetime.

In various embodiments, in addition to transmitting PathHistory information when the pseudonym certificate is changed, PathHistory information may be broadcast periodically during the period of time from a time the pseudonym certificate change occurred, such as during the N seconds (e.g., 1 second). In some embodiments, PathHistory may be transmitted periodically, with the periodicity being much larger than that of BSM. In this manner, not all BSMs contain the PathHistory information, but only some of the BSMs contain the PathHistory. For example, every M BSMs (e.g., wherein M can be an integer, such as 10), PathHistory may be included. As another example, the PathHistory can be add into the BSM every X seconds, where X can be an integer (e.g., 1).

In various embodiments, in addition to transmitting PathHistory information when the pseudonym certificate is changed, the vehicle may continue to estimate the tracking error that other vehicles may develop by tracking the speed and direction of the vehicle based on GPS location and time stamp information in received BSMs. When the estimated tracking error exceeds a certain threshold, the vehicle may include the PathHistory information in BSMs broadcast for a brief period of time (e.g., one second).

In some implementations, when a vehicle's pseudonym certificate changes, the path history related data (e.g., PathHistory information, stored path history points, etc.) may be deleted as part of the pseudonym certificate change operations. Accordingly, sufficient path history points to generate PathHistory information may not be available initially upon a vehicle's pseudonym certificate change. In various embodiments, broadcast of PathHistory after a vehicle's pseudonym certificate changes may be delayed until a sufficient number of path history points are available to generate PathHistory information. In various embodiments, in response to determining that the pseudonym certificate of the vehicle changed, the vehicle may determine whether sufficient path history points are available for PathHistory information generation. In response to determining that sufficient path history points are not available (e.g., because past history points were deleted upon certificate change, because path history was not previously being tracker, etc.), the vehicle may accumulate one or more path history points. For example, the vehicle may record and store its current position, speed, and direction of travel with a timestamp to accumulate a record of path history points. In response to determining that sufficient path history points are available, the vehicle may generate PathHistory Information and transmit the PathHistory. In this manner, PathHistory information may be sent from an earliest available time after both a pseudonym certificate of the vehicle changed occurred and a sufficient number of path history points were available to generate PathHistory information.

Figure 1B:
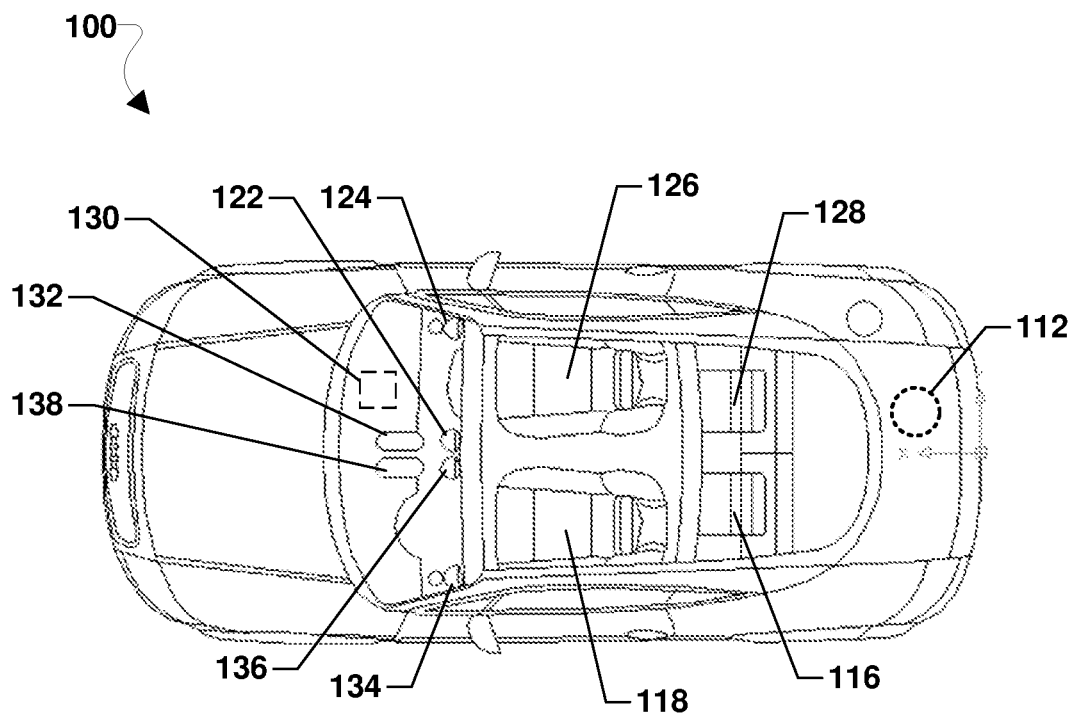

Various embodiments may be implemented within a variety of vehicles, an example vehicle 100 of which is illustrated in FIGS. 1A and 1B. With reference to FIGS. 1A and 1B, a vehicle 100 may include a vehicle computing device 140 (also referred to as an in-vehicle communication device) and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138.

The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a vehicle computing device 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle computing device 140, which is sometimes referred to as an onboard unit (OBU), may be configured with processor-executable instructions to perform various embodiments using information received from various sensors, particularly the cameras 122, 136. In some embodiments, the vehicle computing device 140 may supplement the processing of camera images using distance and relative position (e.g., relative bearing angle) that may be obtained from radar 132 and/or lidar 138 sensors. The vehicle computing device 140 may further be configured to control steering, breaking and speed of the vehicle 100 when operating in an autonomous or semi-autonomous mode using information regarding other vehicles determined using various embodiments.

Figure 1C:
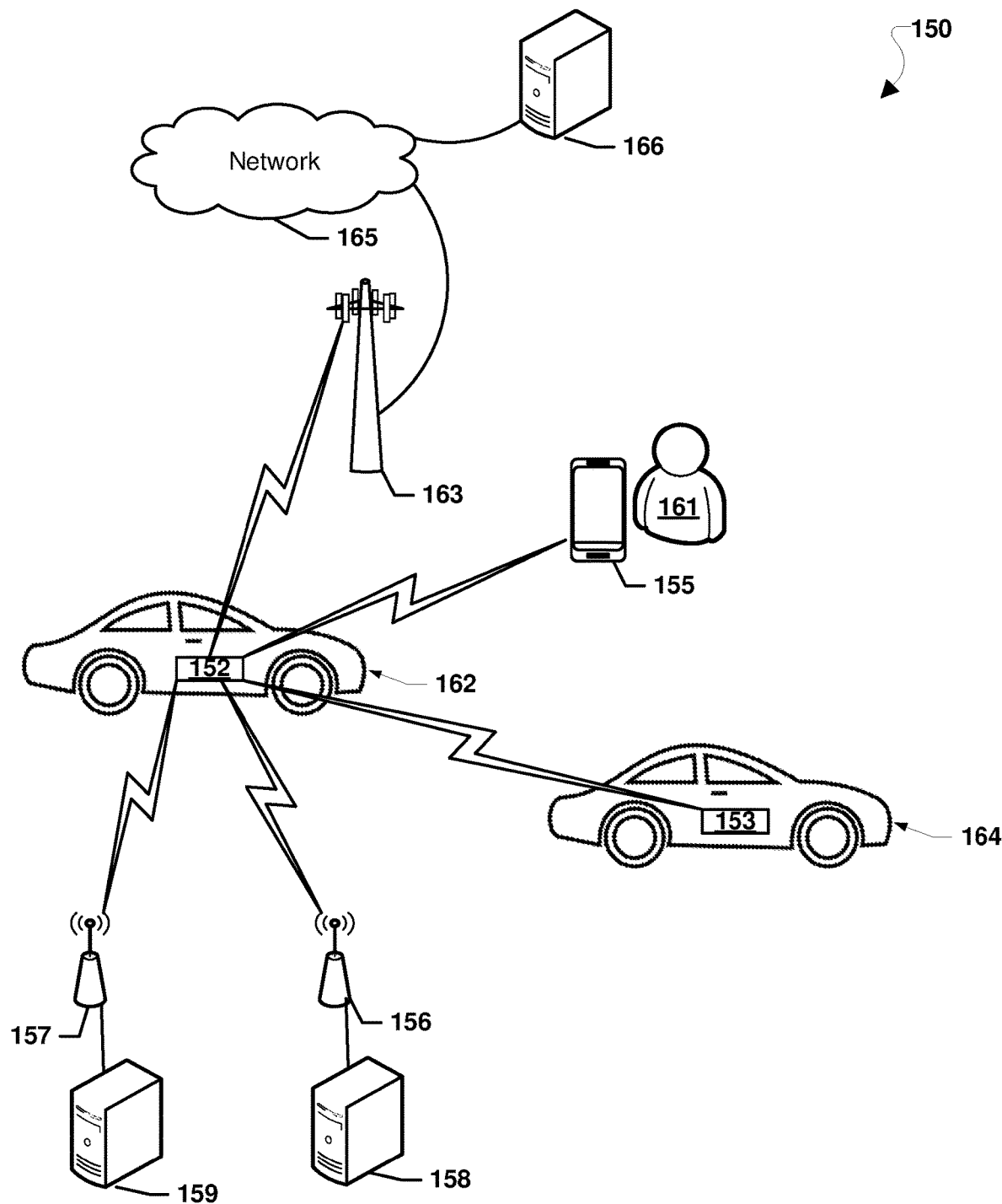
FIG. 1C illustrates an example C-V2X system suitable for implementing various embodiments.

FIG. 1C illustrates an example C-V2X system 150 suitable for implementing various embodiments. With reference to FIGS. 1A-1C, a C-V2X system 150 may include an in-vehicle communication device 152 (also referred to as a vehicle computing device) configured to exchange wireless communications with other communication devices around a vehicle 162 in which the in-vehicle communication device 152 is located. The vehicle 162 may be any type of vehicle, such as an autonomous vehicle (e.g., driverless car, etc.), semi-autonomous vehicle, remotely operated vehicle, etc. The in-vehicle communication device 152 may be a computing device mounted in the vehicle 162 or may be a mobile communication device (e.g., a smartphone, laptop, etc.) temporarily placed within the vehicle 162. The C-V2X system 150 may include various devices in addition to the in-vehicle communication device 152, such as another in-vehicle communication device 153 (also referred to as a vehicle computing device) of another vehicle 164, transmitters 156 and 157 connected to Road Side Units 158, 159, communication device 155 (e.g., a smartphone, laptop, etc.), cellular tower or base station 163 connected to a network 165 and network server 166, etc. Various components of the C-V2X system 150 may be configured to operate as an ITS network to support intercommunication and Safety for surface vehicles.

The in-vehicle communication device 152 may be configured to perform vehicle-to-vehicle (V2V) communications, vehicle-to-infrastructure (V2I) communications, and vehicle-to-pedestrian (V2P) communications. For example, the in-vehicle communication device 152 may establish a device-to-device (D2D) link with another in-vehicle communication device 153 of another vehicle 164 to exchange V2V communications. As another example, the in-vehicle communication device 152 may establish D2D links with transmitters 156 and 157 connected to Road Side Units 158, 159 to exchange V2I communications. As a further example, the in-vehicle communication device 152 may establish a D2D link with the communication device 155, such as a smartphone, laptop, etc., of a user 161 to exchange V2P communications. The D2D links between the in-vehicle communication device 152, the in-vehicle communication device 153, the communication device 155, the Road Side Units 158, 159 may be communication links established independent of a cellular network, such as links establish in the dedicated ITS 5.9 gigahertz (GHz) spectrum. As specific examples, the D2D links may be dedicated short range communication (DSRC) links, LTE direct (LTE-D) links, or any other type link supporting direct device communication.

The in-vehicle communication device 152 may be configured to perform vehicle-to-network (V2N) communications. For example, the in-vehicle communication device 152 may establish network-to-device links with a cellular tower or base station 163 connected to a network 165 and other vehicles 164 to exchange V2N communications. The network-to-device links may include, without limitation, uplinks (or reverse links), downlinks (or forward links), bidirectional links, etc. The network-to-device links may be established according to mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

In some embodiments, the in-vehicle communication device 152 and the cellular tower or base station 163 may include 5G NR functionality with an air interface based on orthogonal frequency division multiplexing (OFDM). The functionality of the cellular tower or base station 163 may be similar in one or more aspects to (or incorporated into) the functionality of a cellular IoT (CIoT) base station (C-BS), a NodeB, an evolved NodeB (eNodeB), radio access network (RAN) access node, a radio network controller (RNC), a base station (BS), a macro cell, a macro node, a Home eNB (HeNB), a femto cell, a femto node, a pico node, or some other suitable entity based on the radio technology used to establish the network-to-device links between the cellular tower or base station 163 and the in-vehicle communication device 152. The cellular tower or base station 163 may be in communication with respective routers that may connect to the network 165 (e.g., core network, Internet, etc.). Using the connections to the cellular tower or base station 163, the in-vehicle communication device 152 may exchange Data with the network 165 as well as devices connected to the network 165, such as other vehicles 164 or any other communication device connected to the network 165.

Figure 2:
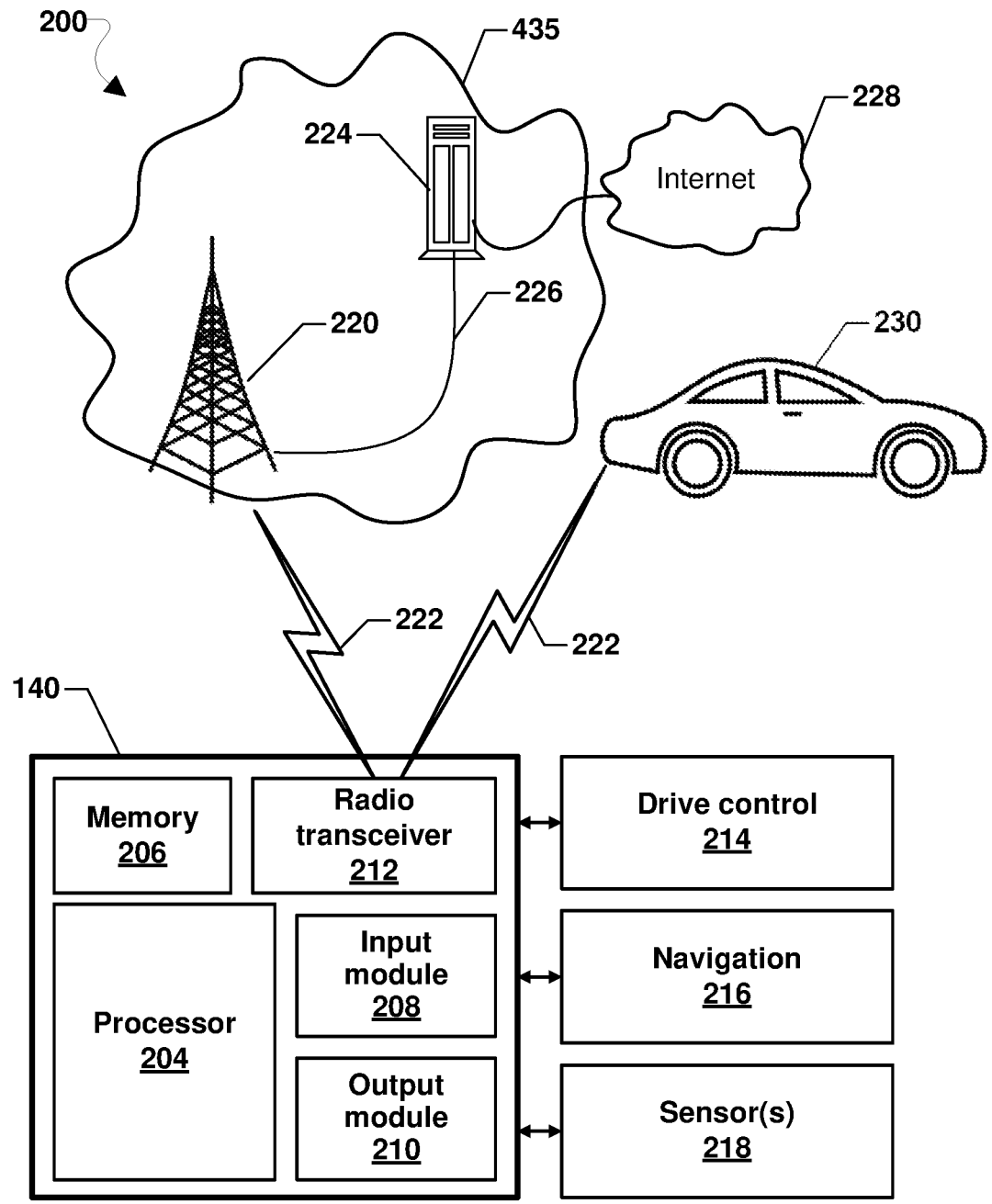
FIG. 2 is a system block diagram illustrating components of a vehicle computing device in communication with road side units and other vehicles suitable for implementing various embodiments.

FIG. 2 is a component block diagram illustrating a system 200 of components and support systems suitable for implementing various embodiments. With reference to FIGS. 1A-2A, the system 200 may include vehicle computing devices 140 (and/or 152, 153) in vehicles 100, 162, 164, 230 that are configured to communicate via wireless communications (e.g., C-V2X protocol messages 222, such as BSM messages, etc.) with other vehicles and road side units 220, and road side units 220 may communicate with network servers 224 (e.g., via wireless or wired communication links 226).

The road side units 220, the network servers 224 and the wired 226 and wireless communication links connecting such units together into an integrated communication and tracking system may comprise and are referred to generally herein as a surface transportation network 435. Network servers 224 of the surface transportation network 435 may be coupled to wide area network, such as the Internet 228, and be configured to route permanent vehicle information to computing platforms of authorized parties and a certificate authority 430 using any of a variety of known network message transport protocols.

A vehicle computing device 140 (and/or 152, 153), which may include various circuits and devices used to control the operation of the vehicle 100, 162, 164, 230 as well as communicate with other devices within a surface transportation network 200.

In the example illustrated in FIG. 2, the vehicle computing device 140 (and/or 152, 153) includes a processor 204, memory 206, an input module 208, an output module 210 and a radio transceiver 212. The vehicle computing device 140 (and/or 152, 153) may be coupled to and configured to control drive control components 214, navigation components 216, and one or more sensors 218 of the vehicle 100, 162, 164, 230. The processor 204 that may be configured with processor-executable instructions to control maneuvering, navigation, and/or other operations of the vehicle 100, 162, 164, 230, including operations of various embodiments. The processor 204 may be coupled to the memory 206. The vehicle computing device 140 (and/or 152, 153)

may include the input module 208, the output module 210, and the radio transceiver 212.

The radio transceiver 212 may be configured to transmit and receive C-V2X protocol messages (e.g., BSMs) with road side units 220 and other vehicles 230.

The input module 208 may receive sensor data from one or more vehicle sensors 218 as well as electronic signals from other components, including the drive control components 214 and the navigation components 216. The output module 210 may be used to communicate with or activate various components of the vehicle 100, 162, 164, 230, including the drive control components 214, the navigation components 216, and the sensor(s) 218.

The vehicle computing device 140 (and/or 152, 153) may be coupled to the drive control components 214 to control physical elements of the vehicle 100, 162, 164, 230 related to maneuvering and navigation of the vehicle, such as the engine, motors, throttles, steering elements, flight control elements, braking or deceleration elements, and the like. The drive control components 214 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The vehicle computing device 140 (and/or 152, 153) may be coupled to the navigation components 216, and may receive data from the navigation components 216 and be configured to use such data to determine the present position and orientation of the vehicle 100, 162, 164, 230, as well as an appropriate course toward a destination. In various embodiments, the navigation components 216 may include or be coupled to a global navigation satellite system (GNSS) receiver system (e.g., one or more Global Positioning System (GPS) receivers) enabling the vehicle 100, 162, 164, 230 to determine its current position using GNSS signals. Alternatively, or in addition, the navigation components 216 may include radio navigation receivers for receiving navigation beacons or other signals from radio nodes, such as Wi-Fi access points, cellular network sites, radio station, remote computing devices, other vehicles, etc. Through control of the drive control elements 214, the processor 204 may control the vehicle 100, 162, 164, 230 to navigate and maneuver. The processor 204 and/or the navigation components 216 may be configured to communicate with a road side unit 230 to receive commands to control maneuvering, receive data useful in navigation, provide real-time position reports, and assess other data.

The vehicle computing device 140 (and/or 152, 153) may be coupled to one or more sensors 218. The sensor(s) 218 may include the sensors 102-138 as described, and may the configured to provide a variety of data to the processor 204.

The processor 204 of the vehicle computing device 140 (and/or 152, 153) may be configured to receive information regarding the vehicle's position and direction of travel (e.g., from navigation components 216), speed (e.g., from drive control components 214), and other information (e.g., from sensor(s) 218) and generate C-V2X messages, such as BSMs, PermanentIDInformationMessages, etc., for transmission by the radio transceiver 212. For example, BSMs inform other vehicles 230 as well as the surface transportation network 200 via road side units 220 of the vehicle's status, position, direction of travel and speed so that other vehicles, such as autonomous vehicles, can avoid collisions. BSMs also inform the surface transportation network 200 of the locations and speeds of vehicles on the roadway, enabling the system to identify safety concerns, traffic jams, etc. BSMs may be transmitted frequently so that other vehicles 230 and road side units 220 are kept informed about the vehicles position and state.

The processor 204 of the vehicle computing device 140 (and/or 152, 153) may be configured to receive BSMs from other vehicles 230 and use such information in controlling vehicle operations (e.g., providing other vehicle positions to drive control components 214 and/or navigation components 216). The processor 204 may also be configured to receive and process other C-V2X messages from road side units 220, and PermanentIDInformationRequestMessages, and use the information in such messages and use such information in controlling vehicle operations, notifying the operator of safety conditions, etc.

In various embodiments, the processor 204 may include permanent vehicle identification information in C-V2X messages that will be received by road side units 220, such as BSMs, PermanentIDInformationMessages, etc. The road side units 220 may be configured to forward C-V2X messages including permanent vehicle identification information, as well as other information, to a server 224 of the surface transportation network 220. The road side units 220 may forward the information as C-V2X messages and/or in other type messages. The server 224 may be configured to forward permanent vehicle identification information, as well as other information, obtained from vehicle C-V2X messages, to an appropriate authorized party, such as law enforcement. In some embodiments, the vehicle C-V2X messages may include an indication of the circumstance or condition triggering the need to transmit permanent vehicle identification information in vehicle C-V2X messages, which information the server 224 to determine the appropriate authorized party to which the permanent vehicle identification information and other vehicle information should be routed. In some embodiments, the vehicle C-V2X messages may identify how permanent vehicle identification information and other information in vehicle C-V2X messages should be routed to the appropriate authorized party, such as an Internet address.

Figure 3:
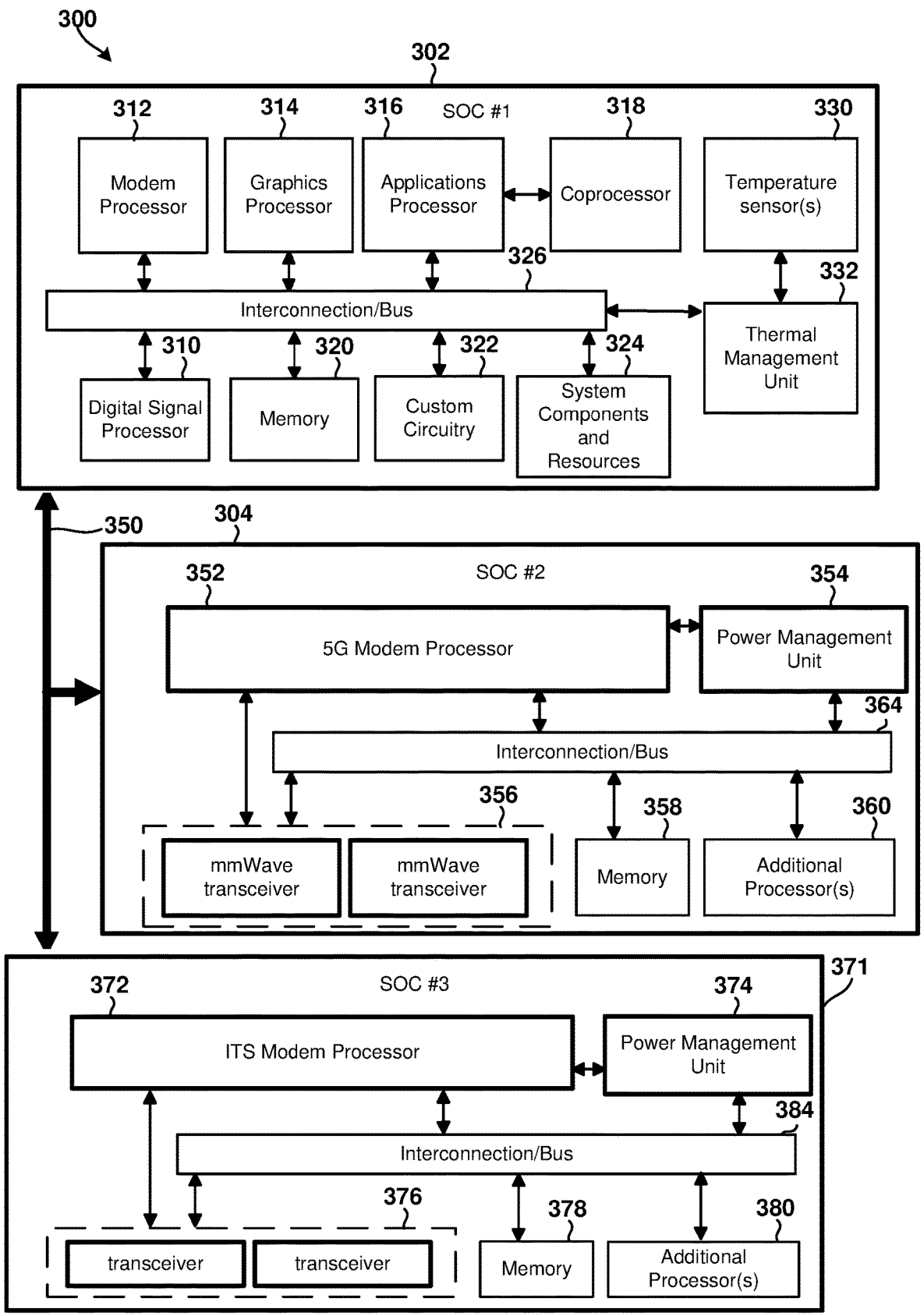
FIG. 3 is a block diagram illustrating components of an example system on chip for use in a vehicle that may be configured to broadcast, receive, and/or otherwise use C-V2X messages in accordance with various embodiments.

While the vehicle computing device 140 (and/or 152, 153) is described as including separate components, in some embodiments some or all of the components (e.g., the processor 204, the memory 206, the input module 208, the output module 210, and the radio transceiver 212) may be integrated in a single device or module, such as a system-on-chip (SOC) processing device. Such an SOC processing device may be configured for use in vehicles and be configured, such as with processor-executable instructions executing in the processor 204, to perform operations of various embodiments when installed into a vehicle The various embodiments may be implemented on a number of single processor and multiprocessor communication devices, including an SoC and/or an SIP. FIG. 3 illustrates an example SIP 300 architecture that may be configured to implement methods for sending path history in accordance with various embodiments. With reference to FIGS. 1A-3, example SIP 300 architecture may be implemented in any SIP, and may be used in any communication device (e.g., in-vehicle communication device 140, in-vehicle communication device 152, in-vehicle communication device 153, Road Side Unit 158, 159, etc.) implementing various embodiments.

In the example illustrated in FIG. 3, the SIP 300 includes three SoCs 302, 304, 371. In some embodiments, the first SoC 302 may operate as a central processing unit (CPU) of the communication device that carries out the instructions of software application programs by performing the arithmetic, logical, control and input/output (I/O) operations specified by the instructions. In some embodiments, the second SoC 304 may operate as a specialized processing unit. For example, the second SoC 304 may operate as a specialized 5G processing unit responsible for managing high volume, high speed (e.g., 5 Gbps, etc.), and/or very high frequency short wave length (e.g., 28 GHz mmWave spectrum, etc.) communications to support 5G NR functionality with an air interface based on OFDM. In some embodiments, the third SoC 371 may operate as a specialized processing unit. For example, the third SoC 371 may operate as a specialized C-V2X processing unit responsible for managing V2V, V2I, and V2P communications over D2D links, such as D2D links establish in the dedicated ITS 5.9 GHz spectrum communications. The SoCs and organization of functionality illustrated in FIG. 3 are a non-limiting example of a SIP as other architectures and organizations of functionality among SoCs, including fewer or more SoCs, are contemplated.

In the example illustrated in FIG. 3, the first SoC 302 includes a digital Signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more temperature sensors 330, and a thermal management unit 332. The second SoC 304 includes a 5G modem processor 352, a power management unit 354, an interconnection/bus module 364, a plurality of mmWave transceivers 356, memory 358, and various additional processors 360, such as an applications processor, packet processor, etc. The third SoC 371 includes an ITS modem processor 372, a power management unit 374, an interconnection/bus module 384, a plurality of transceivers 376 (e.g., transceivers configured to operate in the dedicated ITS 5.9 GHz spectrum), memory 378, and various additional processors 380, such as an applications processor, packet processor, etc.

Each processor 310, 312, 314, 316, 318, 352, 360, 372, 380 may include one or more cores, and each processor/core may perform operations independent of the other processors/cores. For example, the first SoC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 360, 372, 380 may be included as part of a processor cluster architecture (e.g., a synchronous processor cluster architecture, an asynchronous or heterogeneous processor cluster architecture, etc.).

The first, second, and third SoCs 302, 304, 371 may include various system components, resources and custom circuitry for managing sensor Data, analog-to-digital conversions, wireless Data transmissions, and for performing other specialized operations, such as decoding Data packets and processing encoded audio and video signals for rendering in a web browser or other display application. For example, the system components and resources 324 of the first SoC 302 may include power amplifiers, voltage regulators, oscillators, phase-locked loops, peripheral bridges, Data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, autonomous driving systems, traffic sign recognition systems, parking assistance systems, telematics units, tire pressure monitoring systems, collision warning systems, display systems, ADASs, vehicle buses, etc.

The first, second, and third SoCs 302, 304, 371 may communicate via one or more interconnection/bus modules 350. The processors 310, 312, 314, 316, 318 may be interconnected to one or more memory elements 320, system components and resources 324, and custom circuitry 322, and a thermal management unit 332 via an interconnection/bus module 326. Similarly, the processors 352, 360 may be interconnected to the power management unit 354, the mmWave transceivers 356, memory 358, and various additional processors 360 via the interconnection/bus module 364. Similarly, the processors 372, 380 may be interconnected to the power management unit 374, the transceivers 376, memory 378, and various additional processors 380 via the interconnection/bus module 384. The interconnection/bus module 326, 350, 364, 384 may include an array of reconfigurable logic gates and/or implement a bus architecture (e.g., CoreConnect, AMBA, etc.). Communications may be provided by advanced interconnects, such as high-performance networks-on chip (NoCs).

The first, second, and/or third SoCs 302, 304, 371 may further include an input/output module (not illustrated) for communicating with resources external to the SoCs. Resources external to the SoCs may be shared by two or more of the internal SoC processors/cores.

In addition to the SIP 300 discussed above, the various aspects may be implemented in a wide variety of communication devices, which may include a single processor, multiple processors, multicore processors, or any combination thereof.

Figure 4:
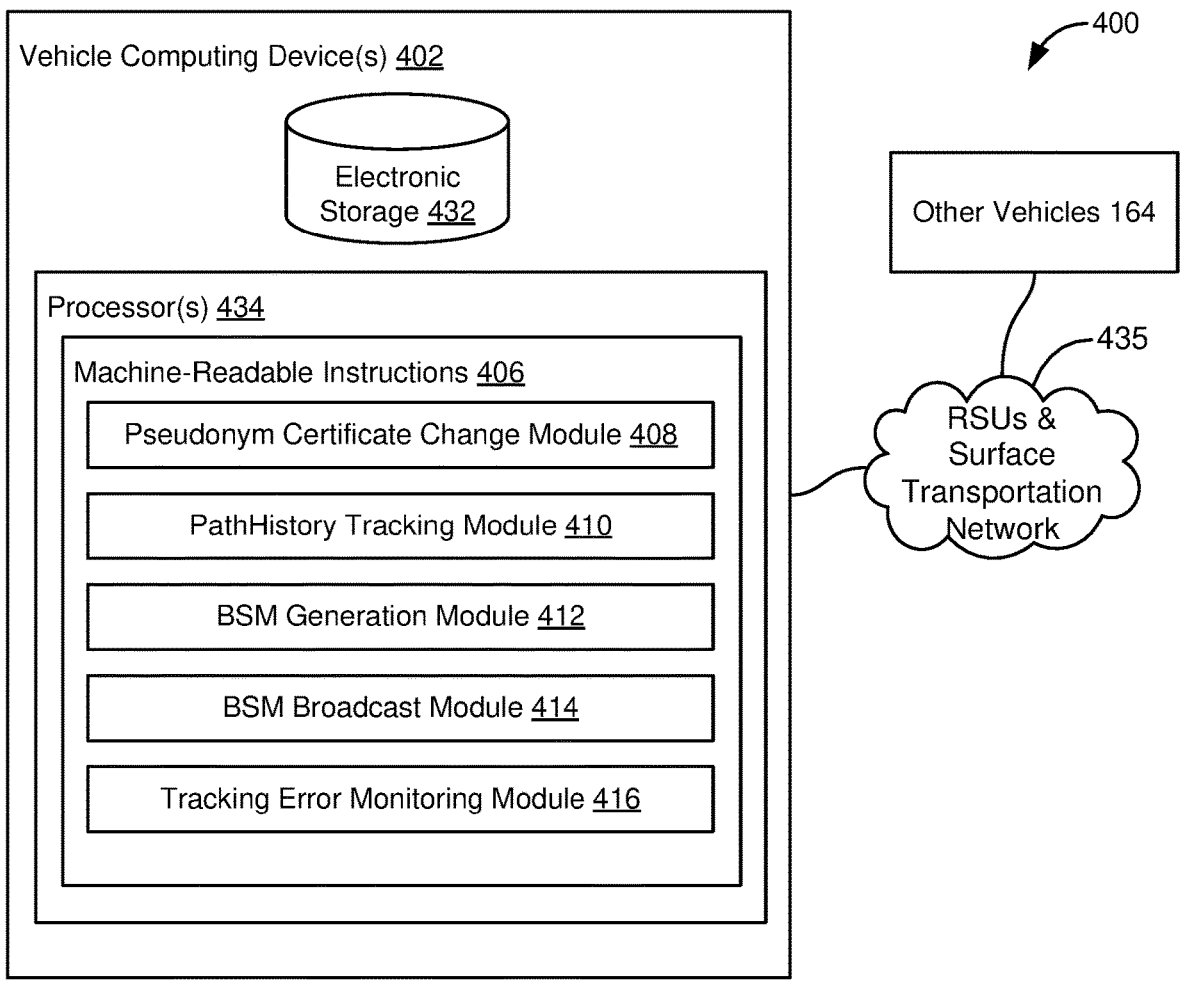
FIG. 4 is a component block diagram illustrating a system configured for sending PathHistory in accordance with various embodiments.

FIG. 4 shows a component block diagram illustrating a system 400 configured to provide PathHistory information in Broadcast Safety Messages (BSMs) sent from a vehicle in accordance with various embodiments. In some embodiments, the system 400 may include one or more vehicle computing devices 402 and/or one or more network servers 166. With reference to FIGS. 1A-4, the vehicle computing device(s) 402 may be similar to the vehicle computing device 140, 152, 153 and include a processor (e.g., 164) or a processing device (e.g., 300) (referred to as a "processor") of a vehicle (e.g., 100, 162, 164, 230).

The vehicle computing device(s) 402 may be configured by machine-executable instructions 406. Machine-executable instructions 406 may include one or more instruction modules. The instruction modules may include computer program modules. The instruction modules may include one or more of a pseudonym certificate change module 408, PathHistory tracking module 410, BSM generation module 412, BSM broadcast module 414, tracking error monitoring module 416, and/or other instruction modules.

Pseudonym certificate change module 408 may be configured to determine whether a pseudonym certificate for the vehicle changed. A pseudonym certificate may change periodically, such as every 300 seconds.

PathHistory tracking module 410 may be configured to generate a geometric path reflecting time tagged vehicle movement over some period of time and/or distance. The PathHistory tracking module 410 may generate a set of PathHistory Points along with their GNSS time to create a set of straight line segments representing the vehicle's historic path. The PathHistory and/or PathHistory points may be configured for inclusion in a BSM message and may be made available to the BSM generation module 412 for inclusion in BSM messages.

BSM generation module 412 may be configured to generate BSM messages. The BSM generation module 412 may be configured to generate BSM messages including PathHistory, such as BSMs including PathHistory Points and GNSS times in information elements of the BSMs. The BSM generation module 412 may be configured to generate BSM messages without PathHistory information therein. The BSM generation module 412 may periodically generate BSMs including PathHistory. As one example, the BSM generation module 412 may generate BSMs including PathHistory for a period of time following a pseudonym certificate change. As another example, the BSM generation module 412 may generate BSMs including PathHistory periodically such that less than all BSMs broadcast during a period include PathHistory. As another example, the BSM generation module 412 may generate BSMs such that a periodicity of broadcasting BSMs including PathHistory is after a selected number of BSMs broadcast without PathHistory, such as after 10 BSMs without PathHistory. As another example, the BSM generation module 412 may generate BSMs such that a periodicity of broadcasting BSMs including PathHistory is after a selected number of seconds, such as after 1 second. The BSM generation module 412 may be configured to generate a BSM including PathHistory in response to a tracking error exceeding an error threshold.

BSM broadcast module 414 may be configured to broadcast BSM messages, such as BSM messages with or without PathHistory, according to C-V2X protocols.

Tracking error monitoring module 416 may be configured to estimate a tracking error that would develop from tracking the vehicle based solely on its GPS location and time stamp information included in BSMs. The tracking error monitoring module 416 may be configured to determine whether a tracking error exceeds an error threshold. The tracking error monitoring module 416 be configured to initiate broadcasting of a BSMs including PathHistory, such as by the BSM generation module 412, for a brief period in response to a tracking error exceeding an error threshold In some implementations, vehicle computing device(s) 402 and/or other vehicles 164 may be operatively linked via the surface transportation network 435 via wireless communication links.

Vehicle computing device(s) 402 may include electronic storage 432, one or more processors 434, and/or other components. Vehicle computing device(s) 402 may include communication lines, or ports to enable the exchange of information with a network and/or other computing platforms. Illustration of vehicle computing device(s) 402 in FIG. 4 is not intended to be limiting.

Electronic storage 432 may include non-transitory storage media that electronically stores information. The electronic storage media of electronic storage 432 may include one or both of system storage that is provided integrally (i.e., substantially non-removable) with vehicle computing device(s) 402 and/or removable storage that is removably connectable to vehicle computing device(s) 402 via, for example, a port (e.g., a universal serial bus (USB) port, a firewire port, etc.) or a drive (e.g., a disk drive, etc.). Electronic storage 432 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 432 may include one or more virtual storage resources (e.g., cloud storage, a virtual private network, and/or other virtual storage resources). Electronic storage 432 may store software algorithms, information determined by processor(s) 434, information received from computing platform(s) 402, information received from authorized party computing platform(s) 404, and/or other information that enables vehicle computing device(s) 402 to function as described herein.

Processor(s) 434 may be configured to provide information processing capabilities in vehicle computing device(s) 402. As such, processor(s) 434 may include one or more of a digital processor, an analog processor, a digital circuit designed to process information, an analog circuit designed to process information, a state machine, and/or other mechanisms for electronically processing information. Although processor(s) 434 is shown in FIG. 4A as a single entity, this is for illustrative purposes only. In some implementations, processor(s) 434 may include a plurality of processing units. These processing units may be physically located within the same device, or processor(s) 434 may represent processing functionality of a plurality of devices operating in coordination. Processor(s) 434 may be configured to execute modules 408, 410, 412, 414, and/or 416, and/or other modules. Processor(s) 434 may be configured to execute modules 408, 410, 412, 414, and/or 416, and/or other modules by software; hardware; firmware; some combination of software, hardware, and/or firmware; and/or other mechanisms for configuring processing capabilities on processor(s) 434. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, and/or 416 are illustrated in FIG. 4 as being implemented within a single processing unit, in implementations in which processor(s) 434 includes multiple processing units, one or more of modules 408, 410, 412, 414, and/or 416 may be implemented remotely from the other modules. The description of the functionality provided by the different modules 408, 410, 412, 414, and/or 416 described below is for illustrative purposes, and is not intended to be limiting, as any of modules 408, 410, 412, 414, and/or 416 may provide more or less functionality than is described. For example, one or more of modules 408, 410, 412, 414, and/or 416 may be eliminated, and some or all of its functionality may be provided by other ones of modules 408, 410, 412, 414, and/or 416. As another example, processor(s) 434 may be configured to execute one or more additional modules that may perform some or all of the functionality attributed below to one of modules 408, 410, 412, 414, and/or 416.

Figure 5A:
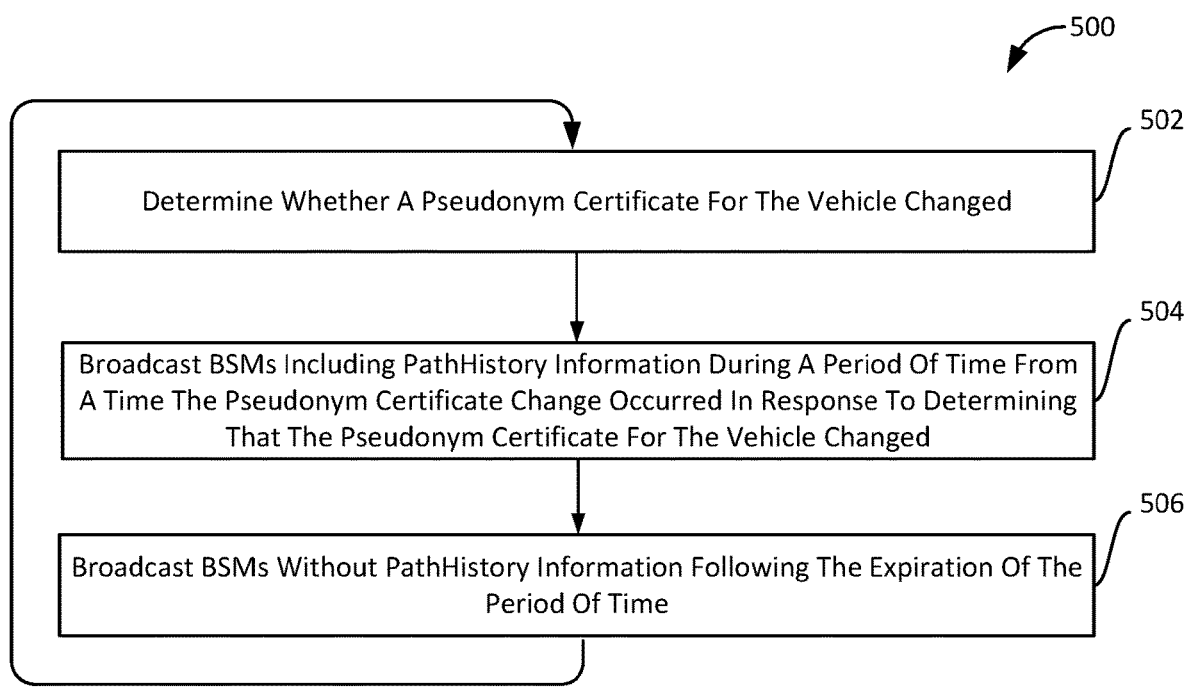
FIGS. 5A, 5B, and 5C are process flow diagrams illustrating methods for sending PathHistory according to various embodiments.
Figure 5B:
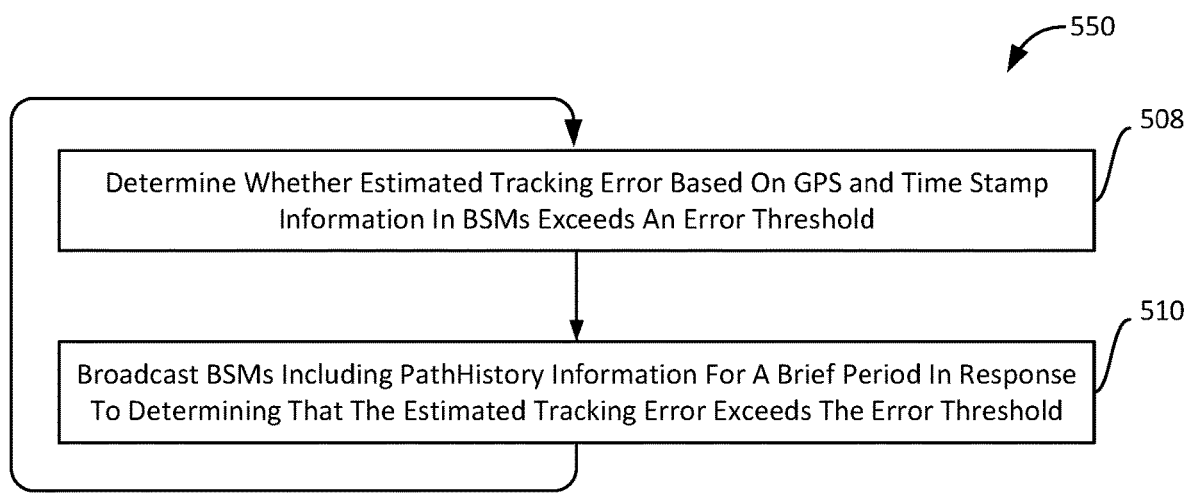
Figure 5C:
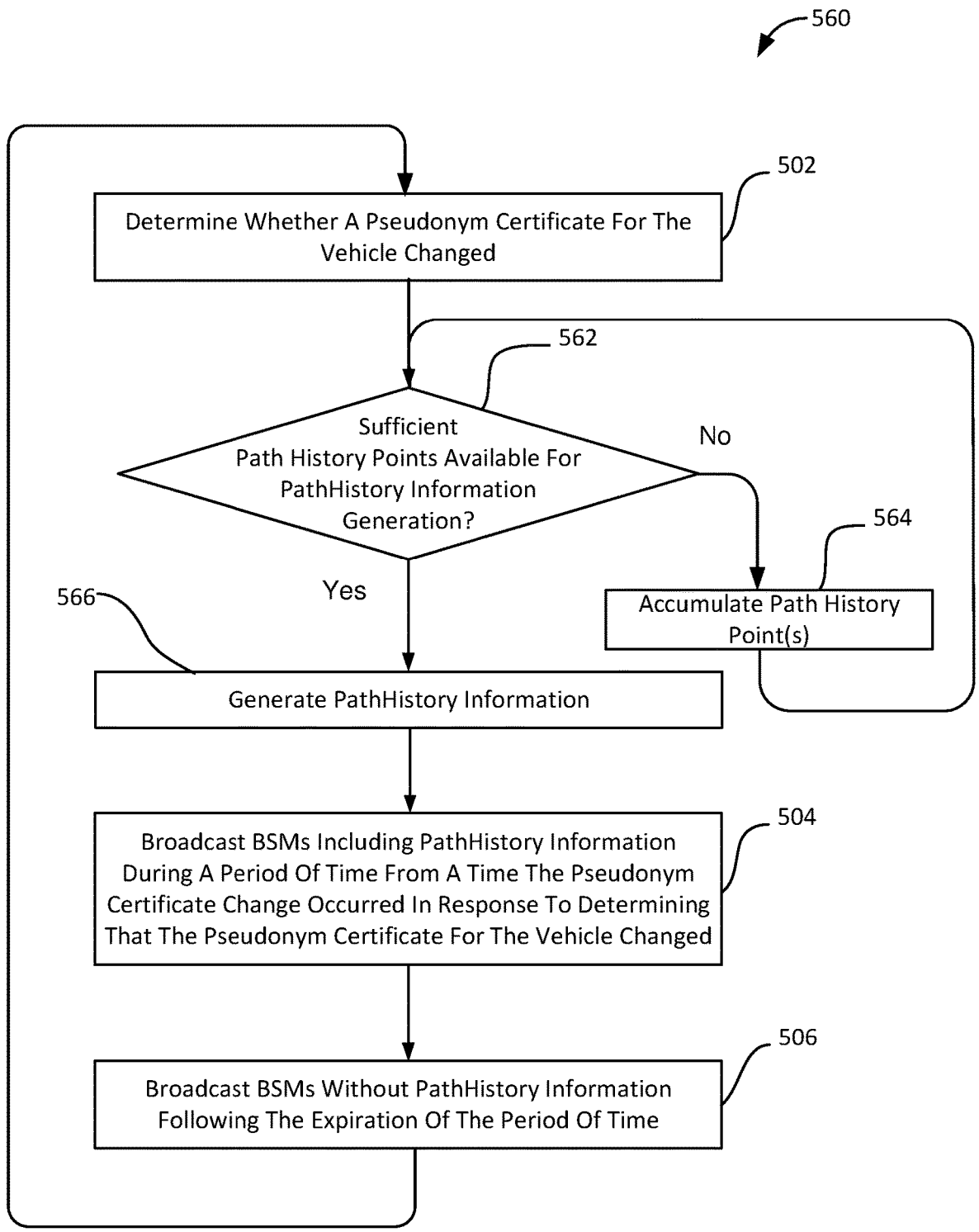

FIGS. 5A, 5B, and 5C are process flow diagrams illustrating methods for providing PathHistory information in BSMs sent form a vehicle according to various embodiments. The operations of the methods illustrated in FIGS. 5A, 5B, and 5C presented herein are intended to be illustrative. In some embodiments, methods may be accomplished with one or more additional operations not described, and/or without one or more of the operations discussed. Additionally, the order in which the operations of methods as illustrated in FIGS. 5A, 5B, and 5C and described are not intended to be limiting.

In some embodiments, methods as illustrated in FIGS. 5A, 5B, and 5C may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods as illustrated in FIGS. 5A, 5B, and 5C in response to instructions stored electronically on an electronic storage medium. The one or more processing devices may include one or more devices configured through hardware, firmware, and/or software to be specifically designed for execution of one or more of the operations of the methods as illustrated in FIGS. 5A, 5B, and 5C. For example, with reference to FIGS. 1A-5C, the operations of the methods illustrated in FIGS. 5A, 5B, and 5C may be performed by a processor (e.g., processor 164 or a processing device 300) of vehicle computing device(s) 140, 152, 153, 402 of a vehicle (e.g., 100, 162, 164, 230).

Referring to FIG. 5A, a processor of a vehicle may perform operations including determining whether a pseudonym certificate for the vehicle changed in block 502. Pseudonym certificates may change periodically, such as every 300 seconds. The changing of the pseudonym certificate may cause the temporary identifier (ID) of the vehicle to change.

In block 504, the processor of the vehicle may perform operations including broadcasting BSMs including PathHistory information during a period of time from a time the pseudonym certificate occurred in response to determining that the pseudonym certificate for the vehicle changed. In various embodiments, the period of time in which BSMs include PathHistory information is less than the time between pseudonym certificate changes. For example, the processor may broadcast BSMs including PathHistory information for one second while pseudonym certificate changes occur every 300 seconds. In some embodiments, every time right after a vehicle changes its pseudonym certificate, the vehicle causes its broadcast BSMs to carry PathHistory for the first N seconds. For example, N can be 1. After the first N seconds, the PathHistory is not needed in BSMs as long as pseudonym certificate remains unchanged because other vehicles can track or store GPS position and time stamp information included in BSMs.

In some embodiments, in addition to transmitting PathHistory information when the pseudonym certificate is changed, PathHistory information may be broadcast periodically during the period of time from a time the pseudonym certificate change occurred, such as during the N seconds (e.g., 1 second). In some embodiments, PathHistory may be transmitted periodically, but the periodicity is much larger than that of BSM. In this manner, not all BSMs contain the PathHistory information, but only some of the BSMs contain the PathHistory. In some embodiments, the periodicity of broadcasting BSMs including PathHistory may be after a selected number of BSMs broadcast without PathHistory. As an example, the selected number may be 10. For example, every M BSMs (e.g., wherein M can be an integer, such as 10), PathHistory may be included. A periodicity of broadcasting BSMs including PathHistory may be after a selected number of seconds. As an example, the selected number may be 1. For example, the PathHistory can be add into the BSM every X seconds, where X can be an integer (e.g., 1).

In block 506, the processor of the vehicle may perform operations including broadcasting BSMs without PathHistory information following the expiration of the period of time. In some embodiments, the vehicle may begin broadcasting BSMs without PathHistory information following the expiration of the period of time, such as after N seconds. In this manner, for the rest of the pseudonym certificate lifetime (e.g., the remaining 299 seconds), BSMs without PathHistory may be broadcast. This may reduce the air resource utilization in comparison to broadcasting PathHistory in every BSM during the pseudonym certificate lifetime.

The method 500 may be performed continuously, such as broadcasting BSMs without PathHistory information in block 506 while determining whether the vehicle's pseudonym certificate has changed in block 502.

FIG. 5B illustrates a method 550 for determining when to broadcast PathHistory information based on tracking errors that may build up from broadcasting BSMs without PathHistory information in block 506 in accordance with some embodiments. In some embodiments, the operations of the method 550 may be performed in conjunction with the operations of the method 500, such as while broadcasting BSMs without PathHistory information in block 506 before detecting that the vehicle's pseudonym certificate has changed in block 502.

In block 508, the processor of the vehicle may perform operations including determining whether an estimated tracking error that could build up in other vehicles relying solely on GPS position and time stamp information in the vehicle's BSMs exceeds an error threshold. Due to inherent errors and time variations in the determination of GPS position and the broadcast of BSMs, the position and track information that can be determined from such information includes position and time errors. Such position and time errors can build up, particularly if the errors are not random, which can result in estimates of vehicle path histories being so inaccurate that the information may decrease traffic safety instead of aiding safe vehicle operations. Thus, each vehicle may monitor the errors in GPS location and time stamp information included in its broadcast BSMs, such as by adding the values to an error tally in memory, and comparing the value in memory to a predefined error threshold.

In block 510, the processor of the vehicle may perform operations including broadcasting BSMs including PathHistory information for a brief period of time (e.g., one second) in response to determining that the tracking error exceeds the error threshold. Upon broadcasting BSMs including PathHistory inform, the processor may also resent the error tally or value in memory to zero and return to determining whether the estimated tracking error of other vehicles exceeds the error threshold.

In some implementations, when a vehicle's pseudonym certificate changes, the path history related data (e.g., PathHistory information, stored path history points, etc.) may be deleted as part of the pseudonym certificate change operations. Accordingly, sufficient path history points to generate PathHistory information may not be available initially upon a vehicle's pseudonym certificate change. In such implementations, broadcast of PathHistory after a vehicle's pseudonym certificate changes may be delayed until after a sufficient number of path history points are available to generate PathHistory information. FIG. 5C illustrates a method 560 for broadcasting PathHistory information in response to ensuring a sufficient number of path history points are available to generate PathHistory information in accordance with some embodiments. In some embodiments, the operations of the method 560 may be performed in conjunction with the operations of the method 550, such as while broadcasting BSMs with PathHistory information in block 510.

In block 502, the processor of the vehicle may perform operations as described for the like numbered block of the method 500 (FIG. 5A) including determining whether a pseudonym certificate for the vehicle changed. In some implementations, when a vehicle's pseudonym certificate changes, the path history related data (e.g., PathHistory information, stored path history points, etc.) may be deleted as part of the pseudonym certificate change operations. Accordingly, sufficient path history points to generate PathHistory information may not be available immediately follow a vehicle's pseudonym certificate change.

In determination block 562, the processor of the vehicle may perform operations to determine whether sufficient path history points are available for PathHistory information generation. As one example, a sufficient number of path history points for PathHistory information generation may be a setting, such as an integer value (e.g., 1, 2, 3, more than 3, etc.), of stored path history points available in a memory available to the vehicle processor. The processor of the vehicle may determine whether sufficient path history points are available for PathHistory information generation based on the setting in any manner. As a specific example, the processor of the vehicle may count the number of stored path history points and compare the number to the integer value setting to determine whether sufficient path history points are available for PathHistory information generation. For example, the processor may subtract the count of stored history points from the integer value setting, and a zero or negative value may indicate that sufficient path history points are available for PathHistory information generation.

In response to determining that sufficient path history points are not available (i.e., determination block 562="No"), the processor of the vehicle may perform operations to accumulate one or more path history points in block 564. The processor of the vehicle may accumulate path history points in various manners. As one example, the processor of the vehicle may record and store the vehicle's current position, speed, and direction of travel with a timestamp every few seconds to accumulate path history points. Periodically, the processor may again perform the operations in determination block 562 to determine whether sufficient path history points have been accumulated for PathHistory information generation.

In response to determining that sufficient path history points are available (i.e., determination block 562="Yes"), the processor of the vehicle may generate PathHistory Information in block 566. For example, the processor of the vehicle may generate PathHistory information by generating a PathHistory data frame defining a geometric path reflecting time tagged vehicle movements over some period of time and/or distance based at least in part on the stored path history points.

In blocks 504 and 506, the processor of the vehicle may perform operations as described for the like numbered block of the method 500 (FIG. 5A) including broadcasting BSMs including PathHistory information during a period of time from when the pseudonym certificate change occurred in response to determining that the pseudonym certificate for the vehicle changed, and broadcasting BSMs without PathHistory information following the expiration of the period of time.

Figure 6:
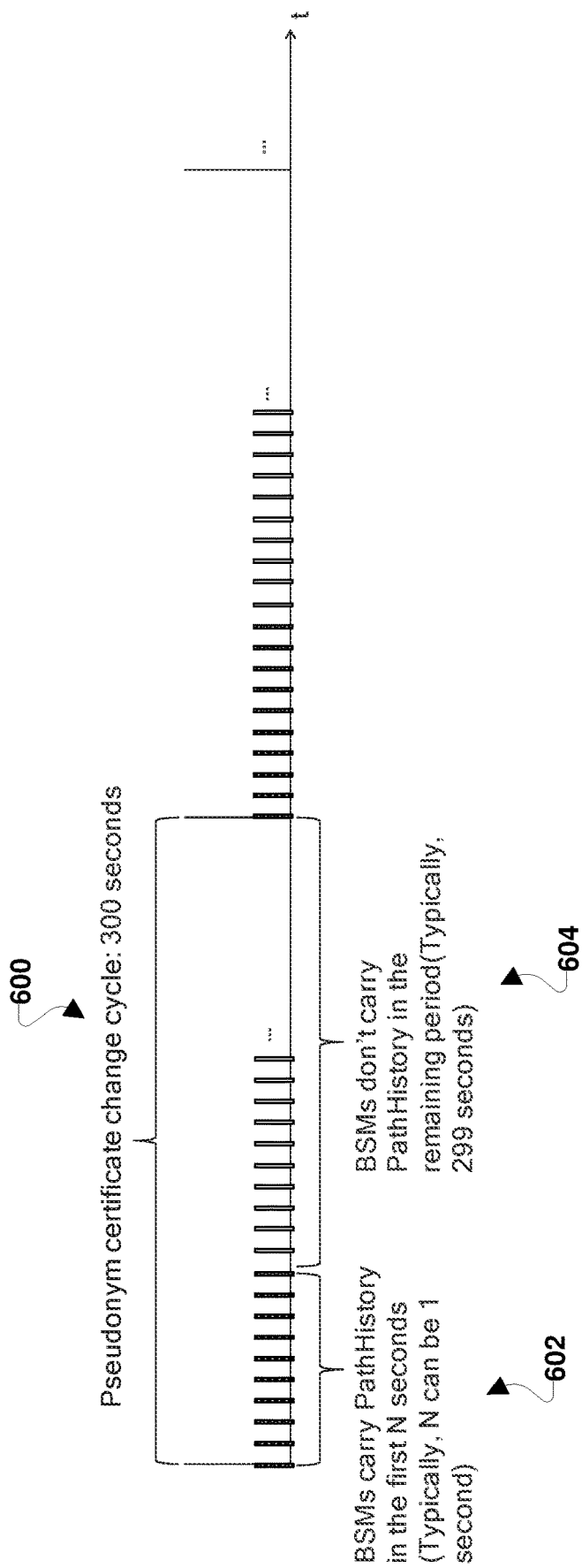
FIG. 6 illustrates an example timeline of sending BSMs according to various embodiments.

FIG. 6 illustrates an example timeline of sending BSMs according to various embodiments. With reference to FIGS. 1A-6, the timeline shows a pseudonym certificate change cycle period 600, such as a period of 300 seconds following a change of pseudonym certificate after which the pseudonym certificate is changed again. In a first period 602 of the pseudonym certificate change cycle period 600, BSMs may carry PathHistory. After the expiration of that period, a second period 604 may be entered in which the BSMs do not carry PathHistory. For example, in accordance with one or more of the operations of the methods illustrated in 5A and/or 5B, a vehicle may send BSMs with PathHistory in the first period 602 and send BSMs without PathHistory in the second period 604.

Figure 7A:
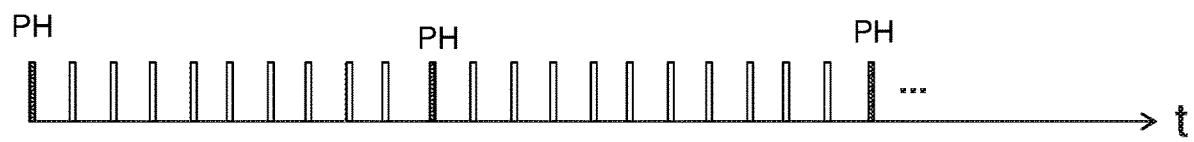
FIG. 7A illustrates an example timeline of sending BSMs according to various embodiments.

FIG. 7A illustrates an example timeline of illustrates an example timeline of sending BSMs according to various embodiments. With reference to FIGS. 1A-7A, the timeline shows a periodic transmission of BSMs with PathHistory information included, the BSM transmissions labeled PH. The other transmissions of BSMs are BSMs that do not include PastHistory information. FIG. 7A illustrates that after 10 BSMs without PastHistory, a BSM with PastHistory may be sent. For example, in accordance with one or more of the operations of the methods illustrated in 5A and/or 5B, a vehicle may send BSMs with PastHistory (labeled PH) with a periodicity of broadcasting BSMs that corresponds to a selected number of BSMs broadcast without PathHistory, such as after every 10 non-PathHistory BSM transmissions.

Figure 7B:
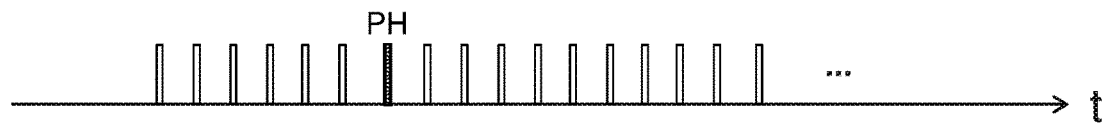
FIG. 7B illustrates an example timeline of sending BSMs according to various embodiments.

FIG. 7B illustrates an example timeline of illustrates an example timeline of sending BSMs according to various embodiments. With reference to FIGS. 1A-7B, the timeline shows a transmission of a BSM with PastHistory information included, the BSM transmission labeled PH. The other transmissions of BSMs are BSMs that do not include PastHistory information. FIG. 7B illustrates that when a tracking error of the vehicle exceeds an error threshold, a BSM with PastHistory may be sent. For example, in accordance with one or more of the operations of the methods illustrated in 5A and/or 5B, a vehicle may send BSMs with PastHistory (labeled PH) with when the tracking error exceeds the error threshold.

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or Data structures stored thereon. Components may communicate by way of local and/or remote processes, function or procedure calls, electronic signals, Data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, Data, signaling, and/or content Messages. It should be understood that any references to terminology and/or technical details related to an individual telecommunication standard or technology are for illustrative purposes only, and are not intended to limit the scope of the Claims to a particular communication system or technology unless specifically recited in the claim language.

Various aspects illustrated and described are provided merely as examples to illustrate various features of the Claims. However, features shown and described with respect to any given aspect are not necessarily limited to the associated aspect and may be used or combined with other aspects that are shown and described. Further, the Claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the Claims.

The hardware used to implement various illustrative logics, logical blocks, modules, and circuits described in connection with the aspects disclosed herein may be implemented or performed with a general purpose processor, a digital Signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or Data structures and that may be accessed by a computer. Disk and disc, as used herein, includes compact disc (CD), laser disc, optical disc, digital versatile disc (DVD), floppy disk, and Blu-ray disc where disks usually reproduce Data magnetically, while discs reproduce Data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the Claims. Various modifications to these aspects will be readily apparent to those skilled in the art, and the generic principles defined herein may be applied to other aspects without departing from the scope of the Claims. Thus, the present disclosure is not intended to be limited to the aspects shown herein but is to be accorded the widest scope consistent with the following Claims and the principles and novel features disclosed herein.

What is claimed is:

1. A method performed in a processor of a vehicle for providing PathHistory information when broadcasting PathHistory information is not required in Broadcast Safety Messages (BSMs), comprising:
  determining whether a pseudonym certificate for the vehicle changed; and
  broadcasting BSMs including PathHistory information during a period of time from a time the pseudonym certificate change occurred in response to determining that the pseudonym certificate for the vehicle changed, wherein the period of time is less than the time between pseudonym certificate changes;
  wherein prior to broadcasting BSMs including PathHistory information during the period of time from the time the pseudonym certificate change occurred in response to determining that the pseudonym certificate for the vehicle changed, the method further comprising:
  determining whether sufficient path history points are available for PathHistory information generation in response to determining that the pseudonym certificate for the vehicle changed;
  accumulating path history points in response to determining that sufficient path history points are not available for PathHistory information generation; and
  generating PathHistory information in response to determining that sufficient path history points are available for PathHistory information generation.

2. The method of claim 1, wherein the period of time is one second.

3. The method of claim 1, further comprising:
broadcasting BSMs without PathHistory information following expiration of the period of time.

4. The method of claim 1, wherein broadcasting BSMs including PathHistory information during the period of time comprises only broadcasting BSMs including PathHistory periodically during the period such that less than all BSMs broadcast during the period include PathHistory.

5. The method of claim 4, wherein a periodicity of broadcasting BSMs including PathHistory is after a selected number of BSMs broadcast without PathHistory.

6. The method of claim 5, wherein the selected number of BSMs broadcast without PathHistory is 10.

7. The method of claim 4, wherein a periodicity of broadcasting BSMs including PathHistory is after a selected number of seconds.

8. The method of claim 7, wherein the selected number of seconds is 1.

9. The method of claim 1, further comprising:
determining whether a tracking error based on tracking the vehicle using vehicle location information included in BSMs exceeds an error threshold; and
broadcasting a BSM including PathHistory information in response to determining that the tracking error exceeds the error threshold.

10. A vehicle, comprising:
a memory; and
a processor coupled to the memory and to a transceiver and configured with process-executable instructions to:
  determine whether a pseudonym certificate for the vehicle changed; and
  broadcast BSMs including PathHistory information during a period of time from a time the pseudonym certificate change occurred in response to determining that the pseudonym certificate for the vehicle changed, wherein the period of time is less than the time between pseudonym certificate changes;
  wherein the processor is further configured with processor-executable instructions to, prior to broadcasting BSMs including PathHistory information during the period of time from the time the pseudonym certificate change occurred in response to determining that the pseudonym certificate for the vehicle changed:
    determine whether sufficient path history points are available for PathHistory information generation in response to determining that the pseudonym certificate for the vehicle changed;
    accumulate path history points in response to determining that sufficient path history points are not available for PathHistory information generation; and
    generate PathHistory information in response to determining that sufficient path history points are available for PathHistory information generation.

11. The vehicle of claim 10, wherein the processor is further configured with processor-executable instructions such that the period of time is one second.

12. The vehicle of claim 10, wherein the processor is further configured with processor-executable instructions to:
broadcast BSMs without PathHistory information following expiration of the period of time.

13. The vehicle of claim 10, wherein the processor is further configured with processor-executable instructions such that broadcasting BSMs including PathHistory information during the period of time comprises only broadcasting BSMs including PathHistory periodically during the period such that less than all BSMs broadcast during the period include PathHistory.

14. The vehicle of claim 13, wherein the processor is further configured with processor-executable instructions such that a periodicity of broadcasting BSMs including PathHistory is after a selected number of BSMs broadcast without PathHistory.

15. The vehicle of claim 14, wherein the processor is further configured with processor-executable instructions such that the selected number of BSMs broadcast without PathHistory is 10.

16. The vehicle of claim 13, wherein the processor is further configured with processor-executable instructions such that a periodicity of broadcasting BSMs including PathHistory is after a selected number of seconds.

17. The vehicle of claim 16, wherein the processor is further configured with processor-executable instructions such that the selected number of seconds is 1.

18. The vehicle of claim 10, wherein the processor is further configured with processor-executable instructions to:
determine whether a tracking error based on tracking the vehicle using vehicle location information included in BSMs exceeds an error threshold; and
broadcast a BSM including PathHistory information in response to determining that the tracking error exceeds the error threshold.

19. A non-transitory processor readable medium having stored thereon processor-executable instructions configured to cause a processor of a vehicle to perform operations comprising:
determining whether a pseudonym certificate for the vehicle changed; and
broadcasting BSMs including PathHistory information during a period of time from a time the pseudonym certificate change occurred in response to determining that the pseudonym certificate for the vehicle changed, wherein the period of time is less than the time between pseudonym certificate changes;

wherein the stored processor-executable instructions are configured to cause a processor of a vehicle to perform operations further comprising:

determining, prior to broadcasting BSMs including PathHistory information during the period of time from the time the pseudonym certificate change occurred in response to determining that the pseudonym certificate for the vehicle changed, whether sufficient path history points are available for PathHistory information generation in response to determining that the pseudonym certificate for the vehicle changed;

accumulating path history points in response to determining that sufficient path history points are not available for PathHistory information generation; and generating PathHistory information in response to determining that sufficient path history points are available for PathHistory information generation.

20. The non-transitory processor readable medium of claim 19, wherein the stored processor-executable instructions are configured to cause a processor of a vehicle to perform operations such that the period of time is one second.

21. The non-transitory processor readable medium of claim 20, wherein the stored processor-executable instructions are configured to cause a processor of a vehicle to perform operations further comprising:

broadcasting BSMs without PathHistory information following expiration of the period of time.

22. The non-transitory processor readable medium of claim 19, wherein the stored processor-executable instructions are configured to cause a processor of a vehicle to perform operations such that broadcasting BSMs including PathHistory information during the period of time comprises only broadcasting BSMs including PathHistory periodically during the period such that less than all BSMs broadcast during the period include PathHistory.

23. The non-transitory processor readable medium of claim 22, wherein the stored processor-executable instructions are configured to cause a processor of a vehicle to perform operations such that a periodicity of broadcasting BSMs including PathHistory is after a selected number of BSMs broadcast without PathHistory.

24. The non-transitory processor readable medium of claim 23, wherein the stored processor-executable instructions are configured to cause a processor of a vehicle to perform operations such that the selected number of BSMs broadcast without PathHistory is 10.

25. The non-transitory processor readable medium of claim 22, wherein the stored processor-executable instructions are configured to cause a processor of a vehicle to perform operations such that a periodicity of broadcasting BSMs including PathHistory is after a selected number of seconds.

26. The non-transitory processor readable medium of claim 25, wherein the stored processor-executable instructions are configured to cause a processor of a vehicle to perform operations such that the selected number of seconds is 1.

27. The non-transitory processor readable medium of claim 19, wherein the stored processor-executable instructions are configured to cause a processor of a vehicle to perform operations further comprising:

determining whether a tracking error based on tracking the vehicle using vehicle location information included in BSMs exceeds an error threshold; and broadcasting a BSM including PathHistory information in response to determining that the tracking error exceeds the error threshold.

* * * * *